(12) United States Patent
Fukushima et al.

(10) Patent No.: US 8,001,326 B2
(45) Date of Patent: *Aug. 16, 2011

(54) PORTABLE TERMINAL

(75) Inventors: Shinichiro Fukushima, Yokohama (JP);
Kazunori Hashimoto, Fujisawa (JP);
Makoto Aikawa, Sagamihara (JP);
Hidenori Nanami, Ichikawa (JP);
Yutaka Takami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 598 days.

This patent is subject to a terminal disclaimer.

(21) Appl. No.: 12/054,797

(22) Filed: Mar. 25, 2008

(65) Prior Publication Data

US 2009/0008444 A1 Jan. 8, 2009

Related U.S. Application Data

(63) Continuation of application No. 10/811,965, filed on Mar. 30, 2004, now Pat. No. 7,356,645.

(30) Foreign Application Priority Data

May 30, 2003 (JP) .................................. 2003-154922

(51) Int. Cl.
*G06F 12/00* (2006.01)
(52) U.S. Cl. ........ 711/115; 235/380; 235/382; 235/384; 340/5.2; 340/5.6; 705/41
(58) Field of Classification Search ................... 711/115; 325/380, 382, 384; 340/5.2, 5.6; 705/41; 235/380, 382, 384
See application file for complete search history.

(56) References Cited

U.S. PATENT DOCUMENTS

| 5,857,152 | A | 1/1999 | Everett |
| 5,991,749 | A | 11/1999 | Morrill, Jr. |
| 5,995,898 | A | 11/1999 | Tuttle |
| 6,809,631 | B2 | 10/2004 | Doi et al. |
| 2002/0116343 | A1 | 8/2002 | Nakamura et al. |
| 2004/0035930 | A1 | 2/2004 | Arisawa et al. |

FOREIGN PATENT DOCUMENTS

| FR | 2 728 815 | 3/2000 |
| GB | 2 291 724 | 1/1996 |
| JP | 08-115389 | 5/1996 |
| JP | 09-212565 | 8/1997 |
| JP | 10-305680 | 11/1998 |
| JP | 2001-236529 | 8/2001 |
| JP | 2001-266178 | 9/2001 |
| JP | 2002-150236 | 5/2002 |
| JP | 2002-222442 | 8/2002 |
| JP | 2002-247157 | 8/2002 |
| JP | 2002-329176 | 11/2002 |
| JP | 2003-016418 | 1/2003 |
| JP | 2003-044888 | 2/2003 |
| KR | 2000-36744 | 7/2000 |
| KR | 2000-84043 | 11/2002 |
| WO | WO 99/33027 | 7/1999 |
| WO | WO 00/45343 | 8/2000 |
| WO | WO 02/071311 | 9/2002 |

*Primary Examiner* — Jasmine Song
(74) *Attorney, Agent, or Firm* — Antonelli, Terry, Stout & Kraus, LLP.

(57) ABSTRACT

A management apparatus including a portable terminal identifying module to receive card information from a non-contact IC card processing unit having a module to communicate with an IC card without contact.

3 Claims, 6 Drawing Sheets

| CUSTOMER ID 600 | HELD IC CARD ID 601 | CONTACT ADDRESS 602 | CUSTOMER NAME 603 | INFORMATION TRANSMITTING CONDITIONS 604 | TRANSMITTED INFORMATION CONTENTS 605 |
|---|---|---|---|---|---|
| ID001 | ID12345 | A@co.jp | A | OUTSTANDING AMOUNT LESS THAN ¥100 | NOTIFY INFORMATION |
| ID002 | ID12346 | B@co.jp | B | OUTSTANDING AMOUNT LESS THAN ¥100 2 WEEKS BEFORE EXPIRATION OF VALIDITY | START RENEWAL PROGRAM NOTIFY INFORMATION |
| ID003 | ID12347 | C@co.jp | C | - | - |
| " | " | " | " | | |

CUSTOMER DATA

PORTABLE TERMINAL

CROSS REFERENCE TO RELATED APPLICATION

This is a continuation of U.S. application Ser. No. 10/811,965, filed Mar. 30, 2004 now U.S. Pat. No. 7,356,645. This application relates to and claims priority from Japanese Patent Application No. 2003-154922, filed on May 20, 2003. The entirety of the contents and subject matter of all of the above is incorporated herein by reference.

BACKGROUND OF THE INVENTION

The present invention relates to a portable terminal with an IC card mounted thereon, a management unit for managing the portable terminal and an IC card management method, or in particular to a portable terminal suitably used for a passenger ticket system or the like and a management unit and an IC card management method therefor.

A system in which an IC card can be used as a passenger ticket for means of transportation has been proposed. A portable terminal with an IC card used as a tag is an example. This portable terminal comprises a main antenna for external radio communication and an IC card antenna whereby the IC card conducts external radio communication. The user of this portable terminal who wants to use a transportation means operated on this system issues a request to the site of, for example, a railway company by communication from the main antenna. Then, the electronic information on a passenger ticket, a coupon ticket or a commuter pass is transmitted to and received by the portable terminal through the main antenna and stored in the IC card. The user taking a train presents the portable terminal carrying the IC card to the ticket gate. The electronic information stored in the IC card is read out and transmitted from the IC card antenna to the ticket gate. The ticket gate, upon receipt of the electronic information, permits the particular user to pass through the gate. An example of such a ticket system is shown in JP-A-2002-247157.

As another example, a system has been proposed in which the value information is stored in an IC card whereby the fare can be paid. Such a ticket system is shown in JP-A-2002-329176.

In this system, the user applies the IC card having stored therein the value information (amount information) through an automatic ticket gate machine ("ticket checking machine") which retrieves the ID information of the IC card at the station where he/she takes a train ("boarding station"). When the IC card is applied through the ticket checking machine at the station he/she gets off ("exit station"), on the other hand, the ticket checking machine retrieves the value information as well as the ID information. From the boarding station and the exit station recognized by the IC card from the ID information retrieved by the ticket checking machines at the boarding station and the exit station, the IC card management system calculates the railway fare and withdraws the value corresponding to the railway fare from the IC card.

This IC card is registered in the IC card management system, and the SF (stored-fare) value can be increased or the validity period of the commuter pass can be automatically renewed in the IC card. The SF value in the IC card is increased according to a rule. In the case where the outstanding value decreases to 300 yen or less, for example, the SF value is automatically increased by 1000 yen. According to this rule, the IC card management system increases the SF value of a given IC card as requested to avoid insufficient outstanding SF value of the IC card.

SUMMARY OF THE INVENTION

In the technique described in JP-A-2002-247157, the operation of purchasing a railway ticket or the like is required on the portable terminal each time the user takes a transportation means. This takes a lot of trouble with inputting information on the one hand, and in the case where the destination station or traveling route designated on the railway ticket purchased is changed, the use is required to do the procedure for the particular change of ticket and fare adjustment at the exit station on the other hand.

According to the technique disclosed in JP-A-2001-329176, in contrast, the user can pass through the ticket gate simply by applying the IC card through the ticket checking machine, and the railway fare is calculated based on the boarding station and the exit station. This railway fare can be paid based on the value information stored in the IC card. Therefore, no operation is required on the part of the user thereby obviating the technical problem of JP-A-2002-247157.

In order to keep the outstanding SF value of the IC card not short of a predetermined amount, however, the IC card has to request the IC card management system to increase the SF value. Also, the IC card management system is required not only to identify and memorize the particular IC card which has requested a SF value increase but also to notify each ticket checking machine of the identification of the particular IC card that has given the request.

The service of renewing the validity period of the commuter pass provided by the technique disclosed in JP-A-2002-329176 is also managed by the IC card management system, and the information on the IC card receiving this service is required to be notified to each ticket checking machine. This is also the case with the IC card which can be used as a commuter pass.

The above-mentioned management and renewal methods pose the problem that both the management cost and the processing time increase with the increase in the number of users.

The technique disclosed in JP-A-2002-329176 can renew the validity period of the commuter pass automatically at the request of the IC card. This poses the problem, however, that the validity period of the commuter pass may be renewed automatically upon expiry of the validity period without the knowledge of the user who may want to know the expiry of the available period.

An object of this invention is to overcome the problems described above, and to provide a easy-to-use portable terminal incorporating an IC card therein, a management unit and an IC card management method in which the SF value of the IC card can be charged or increased by imposing no extraneous burden or reducing the burden on the management system, and the user can be notified of the timing of renewing the validity period of the commuter pass.

Another object of the invention is to provide a portable terminal, a management unit and an IC card management method, in which the increase in the SF value of the IC card or the renewal of the validity period of the commuter pass can be notified while at the same time improving the security of the communication information.

In order to achieve the objects described above, according to this invention, the contents of a non-contact IC card incorporated in a mobile telephone are checked at a predetermined timing by the mobile telephone, and any case of non-contact access is detected to charge the SF value of the IC card or renew the validity period of the commuter pass as required.

Also, according to this invention, the ticket checking machine and the management unit collaborate with each other in such a manner that in the case where a portable telephone incorporating a non-contact IC card is passed through a ticket gate, the management unit transmits the information on the value charge and the renewal of the commuter pass validity period to the portable telephone based on the customer data and the conditions for information transmission registered in the management unit derived from the data passed through the ticket gate. In this way, the user can increase the SF value or renew the validity period of the commuter pass at an appropriate timing.

Further, according to this invention, the mobile telephone includes the function to identify the user by the fingerprints at the time of charging the SF value or renewing the validity period of the commuter pass, thereby making it possible to charge or increase the SF value or renew the validity period of the commuter pass with an improved security.

As described above, according to this invention, there is provided a portable terminal comprising a non-contact IC card or an IC card having the dual function of contact and non-contact I/Fs, wherein the outstanding SF value and the validity period of the commuter pass in the card are checked by the portable terminal at a predetermined timing. In this way, the SF value can be charged or the validity period of the commuter pass can be renewed, as the case may be, whenever required.

Also, the management unit that has acquired the card information from the IC card passing through a ticket gate notifies the portable terminal through a network that the outstanding amount is about to run short or the validity period of the commuter pass soon expires or sends to the portable terminal the information for starting a program to charge the SF value. In this way, the user can be informed of the timing of charging the SF value or renewing the commuter pass validity period without increasing the processing cost or the processing time of the management unit and without the need of checking the outstanding amount of the SF value or the validity period of commuter pass on the part of the portable terminal.

Further, since the portable terminal is equipped with various input devices, various identifications or authentications make it possible to provide the service whereby the SF value can be charged and the validity period of the commuter pass can be renewed with a higher security.

BRIEF DESCRIPTION OF THE DRAWINGS

These and other features, objects and advantages of the present invention will become more apparent from the following description when taken in conjunction with the accompanying drawings, wherein.

DESCRIPTION OF THE EMBODIMENTS

Embodiments of the present invention are described below with reference to the accompanying drawings.

Figure 1:
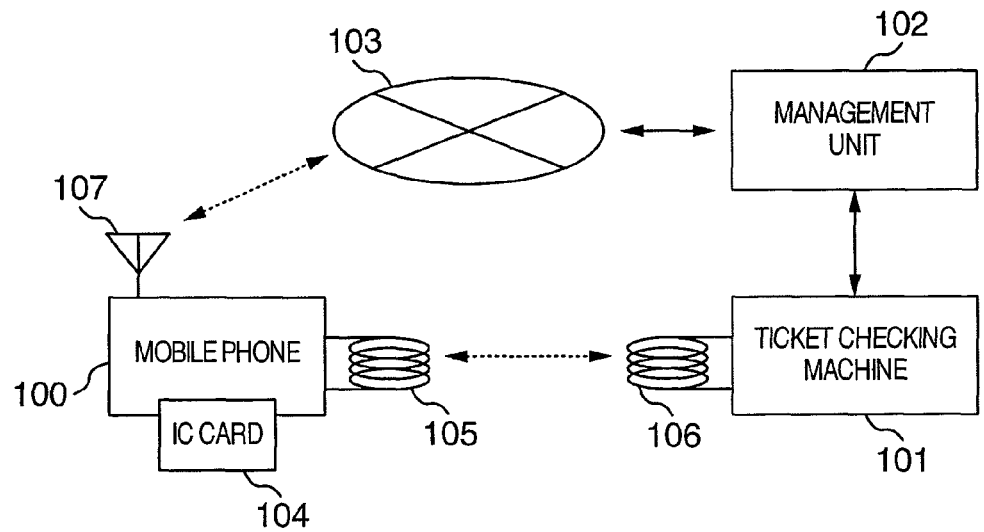
FIG. 1 is a diagram showing a method of managing an IC card according to an embodiment of this invention.

FIG. 1 is a diagram showing an IC card management method according to an embodiment of the invention. Reference numeral 100 designates a portable terminal, numeral 101 a ticket checking machine 101, numeral 102 a management unit, numeral 103 a network, numeral 104 an IC card, and numerals 105, 106 antennas.

In FIG. 1, this system is configured of the portable terminal 100, the ticket checking machine 101, the management unit 102 and the network 103.

The portable terminal 100 has the IC card 104 built therein, and also includes an antenna 107 for communication with the management unit 102 through the network 103 and an antenna 105 for communication with a non-contact IC card reader/writer, not shown, of the ticket checking machine 101. The ticket checking machine 101 has the non-contact IC card reader/writer built therein, and can communicate with the non-contact IC card 104 built in the portable terminal 100 through the antenna 106. The management unit 102 manages the information of the IC card 104 and exchanges the required information with the ticket checking machine 101. Also, the management unit 102 can manage the charge of the SF value or the renewal of the validity period of the commuting ticket in the IC card 104. The information related to the commuter pass users and the users of the various data services supplied from the management unit 102 are registered in the customer data base, not shown, of the management unit 102 as information related to each IC card ID.

The portable terminal 100 can communicate with the management unit 102 through the network 103. Also, the ticket checking machine 101 and the management unit 102 are connected to and communicable with each other through a dedicated communication line and communicable with each other. The ticket checking machine 101 can of course be equipped with a part or the whole of the functions of the management unit 102, or the functions may be distributed among a plurality of management units 102.

As a first example of this system, an explanation is given about a case in which the SF value and the information on the commuter pass (hereinafter referred to as the card information) are stored in the IC card 104, and the portable terminal 100 checks the card information to charge the SF value or renew the validity period of the commuter pass.

Figure 2:
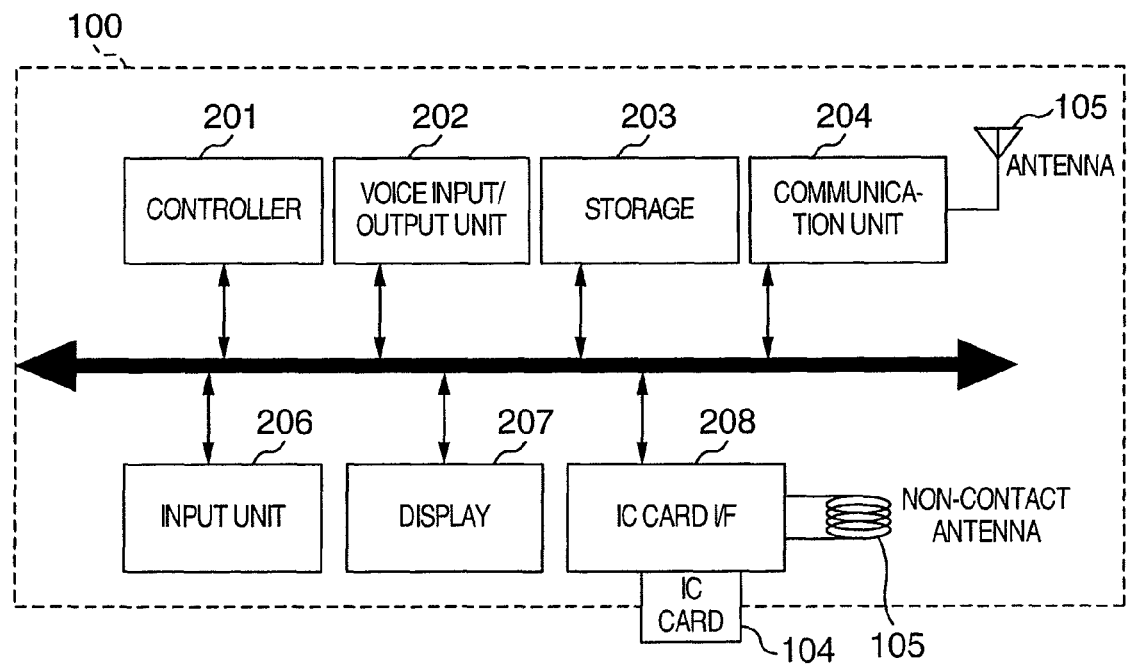
FIG. 2 is a block diagram showing an internal configuration of a portable terminal according to the embodiment shown in FIG. 1.

FIG. 2 is a block diagram showing an internal configuration of the portable terminal 100 shown in FIG. 1 according to an embodiment of the invention. Numeral 201 designates a control section, numeral 202 a voice input/output section, numeral 203 a storage section, numeral 204 a communication section, numeral 206 an input operation section, numeral 207 a display section, and numeral 208 an IC card I/F (interface) section. In FIG. 2, the component parts corresponding to those shown in FIG. 1 are designated by the same reference numerals, respectively.

In FIG. 2, this embodiment comprises the control section 201 for holding the required program and data and controlling the portable terminal 100 as a whole by various determinations and calculations, the input/output section 202 for inputting/outputting the speaking voice, the storage section 203 for holding the various information set by the user of the portable terminal 100 and the data and the programs downloaded, the communication section 204 for conducting voice communication and data communication through the antenna 107, the operation section 206 for inputting the information through the operating buttons such as ten-keys, the display section 207 for displaying the telephone number information and the contents screen from an internet, and the IC card I/F section 208 for communication with the IC card 104 or the non-contact reader/writer of the ticket checking machine 101 through the antenna 105.

The IC card 104 may be either of non-contact type or may have a dual function of contact and non-contact I/Fs. Further, the IC card 104 may be removable from the portable terminal 100.

The SF value of the ticket is held in the IC card 104 built in the portable terminal 100. The ticket is checked at the boarding station and the exit station, and the user can pass through the ticket gates of both the boarding station and the exit station by approximating the portable terminal 100 to the ticket checking machine 101. At the same time, the value including the railway fare for the section from the boarding station to the exit station is subtracted by presenting the portable terminal 100 to the ticket checking machine at the exit station. In the case where the commuter pass is held in the IC card 104, the validity period thereof is checked by the ticket checking machine 101 thereby to allow or disallow the user to pass through the ticket gate.

Figure 3:
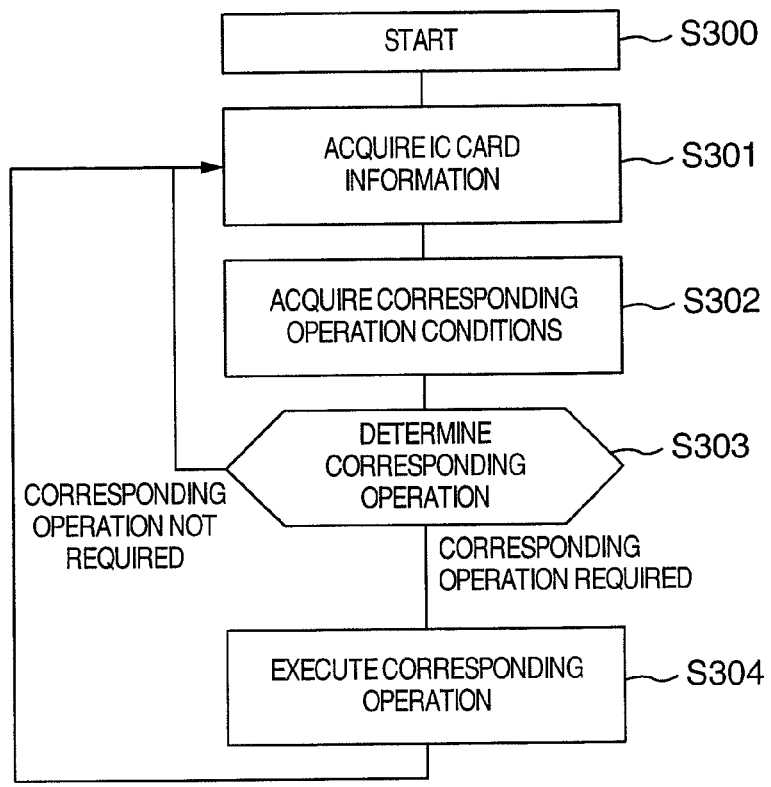
FIG. 3 is a flowchart showing a specific example of the process corresponding to the operation of accessing a non-contact IC card of the portable terminal shown in FIG. 1.

FIG. 3 is a flowchart showing a specific example of the operation performed to process the outstanding SF value of the portable terminal 100 shown in FIG. 2. This flowchart represents the processing steps for the automatic check function of the control section 201 of the portable terminal 100 which checks by itself to see whether the outstanding value in the IC card 104 is smaller than a predetermined amount or not, and if so, automatically charges the SF value.

In FIG. 3, the first step is for the user to switch on the portable terminal 100, and the control section 201 starts the process based on the user setting or the like stored in the storage section 203 (S300). At a predetermined timing set by the user (at predetermined time intervals or at a specific time point, for example), the IC card 104 is accessed thereby to acquire the card information, i.e. the outstanding SF value (S301), and also the conditions for the corresponding operation set by the user and the corresponding operation ID (ID information) (S302).

This corresponding operation, which is performed in correspondence with the card information acquired from the IC card 104, is the charge operation for the outstanding SF value. The conditions for the corresponding operation, on the other hand, are defined as the conditions for performing the corresponding operation. In the case where the outstanding SF value is reduced to 1,000 yen or less, for example, 3,000 yen is charged under the conditions set by the user through the portable terminal 100. The conditions for the corresponding operation are stored in the IC card 104, and adapted to be set and changed by the user.

Once the outstanding SF value and the conditions for the corresponding operation are acquired, the control section 201 compares them and determines whether the corresponding operation is to be executed or not (S303). In the case where the outstanding SF value meets the conditions for the corresponding operation (the outstanding SF value exceeds 1,000 yen in the above-mentioned case), it is determined that the corresponding operation is not required, and the process returns to step S301. In the case where the outstanding SF value fails to meet the conditions for the corresponding operation (the outstanding SF value is not more than 1,000 yen in the above-mentioned case), on the other hand, the corresponding operation is performed and the SF value is charged (increased by 3,000 yen in the above-mentioned case) (S304) and the process returns to step S301.

This operation is carried out at a predetermined timing such as upon lapse of each time length or on a predetermined occasion (when communicating with the ticket checking machine 101, for example). The timing of this operation can be appropriately set by the user.

The corresponding operation (S304) is carried out in the following manner, for example.

The control section 201, upon determination that the conditions for the corresponding operation are met (S303), starts the change program built in the IC card 104, and communicates with a financial institution such as a bank, not shown, through the communication section 204 and the antenna 107, requesting to withdraw the amount (300 yen in this case) required to charge the SF value, from the account of the portable terminal user. The financial institution, in response to the request, withdraws the required amount from the same account and transmits the amount information to the portable terminal 100. The portable terminal 100 receives the amount information from the antenna 107 through the communication section 204, and transfers the amount to the IC card 104 from the IC card I/F section 208. As a result, the transferred amount is charged as a SF value in the IC card. As an alternative, the portable terminal 100 notifies the result of the aforementioned determination by communication to the management unit 102 from the communication section 204 and the antenna 107 through the network 103. The management unit 102, upon receipt of this notice, transfers the value to be charged (300 yen in this case) for executing the corresponding operation to the portable terminal 100 through the network 103. The portable terminal 100 receives this value from the antenna 107 through the communication section 204, and charges it in the IC card 104 from the IC card I/F section 208.

Depending on the setting by the user, the display section 207 can display the information as to the insufficient outstanding amount on the screen. Also, the validity period of the commuter pass can be checked and an instruction can be given to renew it.

Next, the IC card management method shown in FIG. 1 according to another embodiment is explained with reference to a case in which the portable terminal 100, in collaboration with the ticket checking machine 101 and the management unit 102, charges the outstanding SF value or renews the validity period of the commuter pass.

Figure 4:
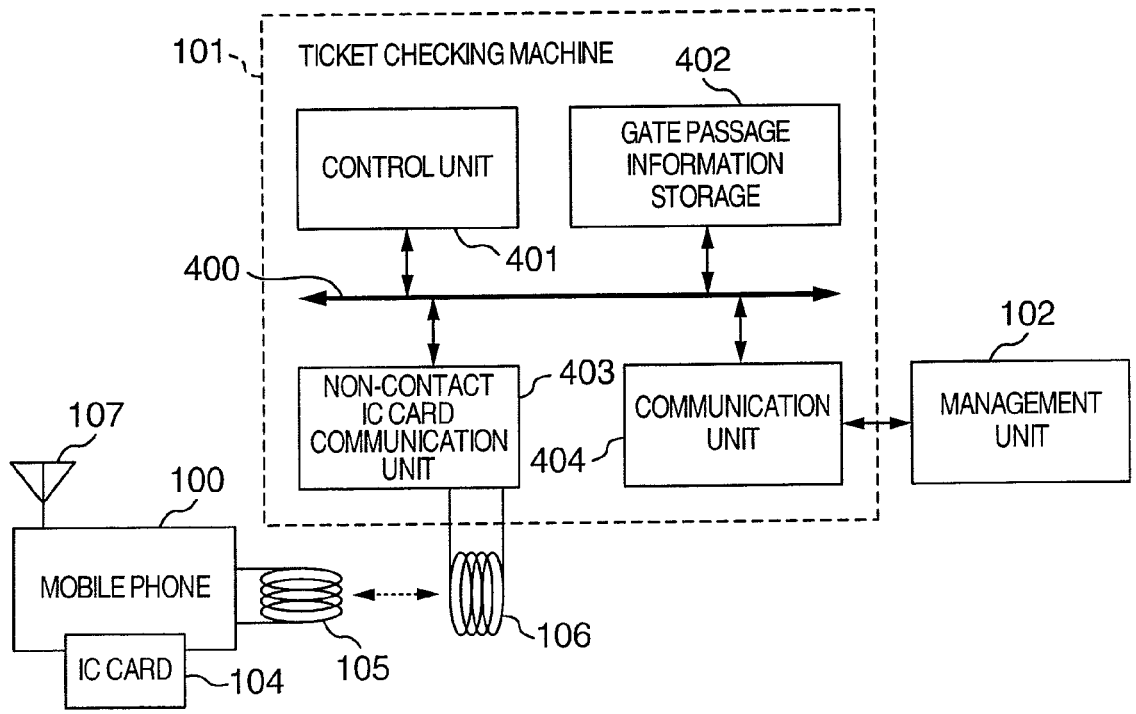
FIG. 4 is a block diagram showing an internal configuration of a specific example of the ticket checking machine shown in FIG. 1.

FIG. 4 is a block diagram showing the internal configuration of a specific example of the ticket checking machine 101 shown in FIG. 1. Numeral 401 designates a control section, numeral 402 a gate passage information storage section, numeral 403 a non-contact IC card communication section, and numeral 404 a communication section. In FIG. 4, the component parts corresponding to similar component parts in FIG. 1 are designated by the same reference numerals, respectively, and not explained again.

In FIG. 4, the ticket checking machine 101 comprises the control 401 for holding the required program and data and controlling the ticket checking machine 101 as a whole by various determinations and calculations, the gate passage information storage section 402 for acquiring and holding the ID (identification information) and the card information of the IC card 104 processed by the ticket checking machine 101, the non-contact IC card communication section 403 having the antenna 106 for communication with the non-contact IC card 104 mounted in the portable terminal 100, and the communication section 404 for exchanging various data with the management unit 102.

When the user approximates the portable terminal 100 having the IC card 104 mounted therein to the ticket checking machine 101, the control section 201 of the portable terminal 100 (FIG. 2) reads the card information from the IC card 104, and transmits the card information from the IC card I/F section 208 to the ticket checking machine 101 through the non-contact antenna 105. The ticket checking machine 101 shown in FIG. 4 receives the card information from the non-contact antenna 106 through the non-contact IC card communication section 403 under the control of the control section 401, and stores it in the gate passage information storage section 402. After that, the control section 401 reads the card information from the gate passage information storage section 402 and transmits the information from the communication section 404 to the management unit 102.

Figures 5, 6:
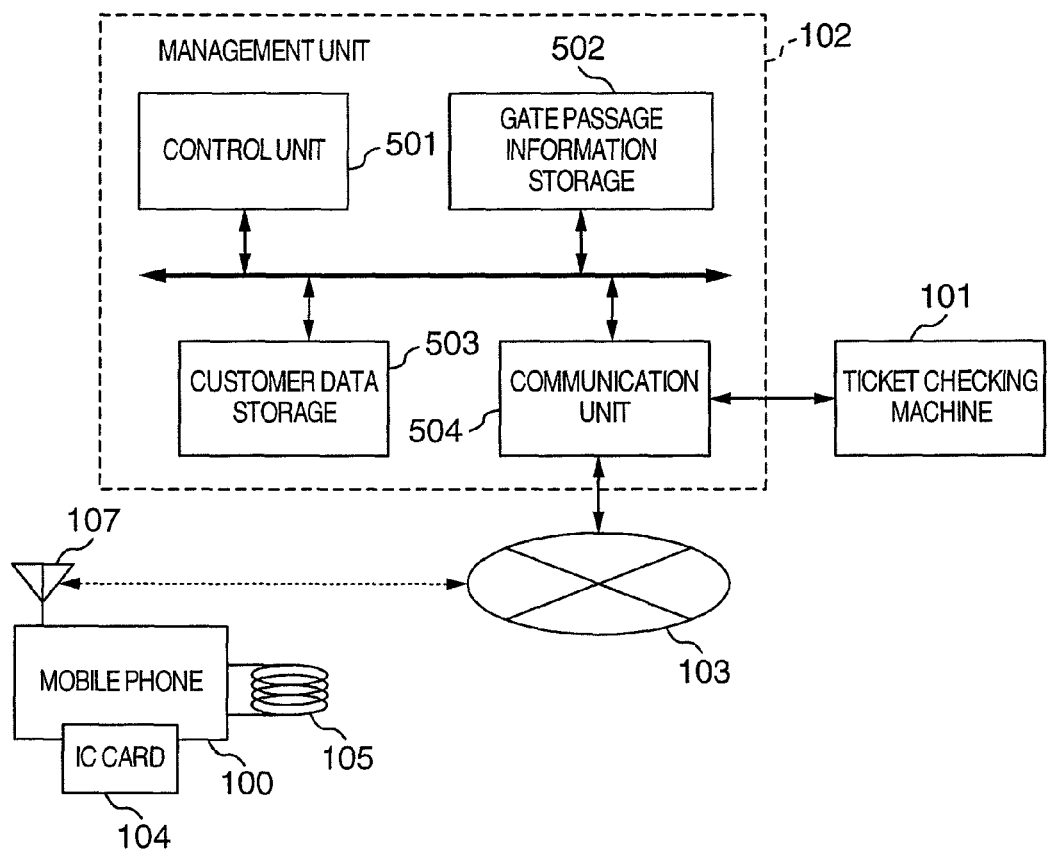
FIG. 5 is a block diagram showing an internal configuration of the management unit according to the embodiment shown in FIG. 1 operated by an IC card management method according to another embodiment of the invention.
FIG. 6 is a diagram showing a specific example of the customer data stored in a customer data storage section shown in FIG. 5.

FIG. 5 is a block diagram showing the internal configuration of the management unit 102 shown in FIG. 1 operated by the IC card management method according to another embodiment of the invention. Numeral 501 designates a control section, numeral 502 a gate passage information storage section, numeral 503 a customer data storage section, and numeral 504 a communication section. In FIG. 5, the component parts similar or identical to those in FIG. 1 are designated by the same reference numerals, respectively, and not described again.

In FIG. 5, the management unit 102 is configured of the control unit 501 for holding the required program and data to perform the control operation of the management unit 102 as a whole including the value charge and the commuter pass validity period renewal by various determinations and calculations, the gate passage information storage section 502 for acquiring and holding the ID information and the card information of the non-contact IC card 104 processed in the ticket checking machine 101, the customer data storage section 503 for holding the information including the card ID of the user, the address of the portable terminal 100 and the conditions for various information services, and the communication section 504 for exchanging various data with the portable terminal 100 and the ticket checking machine 101.

FIG. 6 is a diagram showing a specific example of the customer data held in the customer data storage section 503 of the management unit 102.

In FIG. 6, the customer data include a customer ID 600 for identifying the customer (the user of the non-contact IC card 104), a held IC card ID 601 for identifying the non-contact IC card 104 held by the customer, a contact address 602 of the portable terminal 100 required for notifying the information and starting a specific program, a customer name 603, information transmitting conditions 604 defining the conditions of the non-contact IC card 104 as acquired by the ticket checking machine 101 under which the information is transmitted to the user (customer), and transmitted information contents 605 for determining the information to be transmitted in the case where the information transmitting conditions 604 are satisfied.

The information transmitting conditions 604 and the transmitted information contents 605 are set by the customer. With regard to the customer A, for example, "the outstanding amount of less than 100 yen" in SF value is set as the information transmitting conditions, and the "notify information" is set as the transmitted information contents. Specifically, in the case where the outstanding SF value in the non-contact IC card is reduced to less than 100 yen, the fact is notified to the non-contact IC card 104, which in turn notifies the user through the display section 207 or the voice input/output section 202.

With regard to the customer B, the information transmitting conditions are set as "the outstanding value of less than 100 yen" in SF value, and the transmitted information contents are set as "start the renewal program". Specifically, in the case where the outstanding SF value in the non-contact IC card 104 is reduced to less than 100 yen, the information is transmitted to the IC card 104 to start the renewal program built therein for charging the SF value. The non-contact IC card 104, upon receipt of this information, starts the renewal program and charges the SF value. With regard to the commuter pass, on the other hand, the information transmitting conditions are set as "two weeks before expiration of validity" and the transmitted information contents are set as "notify information". In this case, the portable terminal 100 is notified two weeks before expiry of the validity period of the commuter pass, and the portable terminal 100 notifies the fact to the user on the screen or by voice. Further, in the case of the commuter pass, the transmitted information contents may be set as "notify information" and "start renewal program" at the same time. In this case, the notice is given while at the same time transmitting an instruction to start the renewal program to the portable terminal 100, with the result that the program is started to renew the validity period of the commuter pass in the non-contact IC card 104. The validity period of the commuter pass is renewed in such a manner that the non-contact IC card 104, when passed through the ticket checking machine 101 after receiving the renewal program start instruction, for example, starts the renewal program by communication with the management unit 102 through the ticket checking machine 101 as to the information on the commuter pass and the commuter pass charge. As an alternative, after receiving the renewal program start instruction, a predetermined operation is performed at the portable terminal 100 to renew the validity period of the commuter pass, so that the validity period of the commuter pass is renewed in similar fashion by communication between the portable terminal 100 and the management unit 102 through the network 103.

Figure 7:
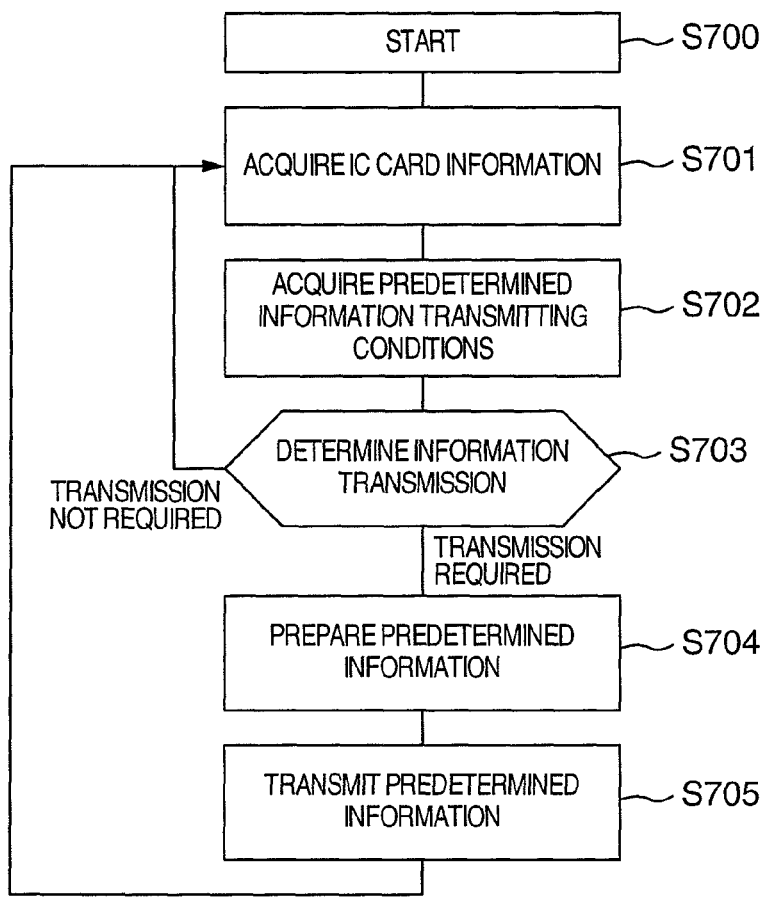
FIG. 7 is a flowchart showing a specific example of the process of transmitting predetermined information to the portable terminal from the management unit shown in FIG. 5.

FIG. 7 is a flowchart showing a specific example of the steps taken by the management unit 102 shown in FIG. 5 for processing the outstanding SF value and the validity period of the commuter pass by the IC card management method according to another embodiment of the invention. This specific example shows the processing step of determining, based on the customer data set in the customer data storage section 503, whether the information on the outstanding value and the validity period of the commuter pass are to be transmitted or not to the portable terminal having mounted therein the IC card 104 of the user, and the other processing steps to be taken, in the case where the management unit 102 acquires the gate passage data of the IC card 104 held in the gate passage information storage section 402 of the ticket checking machine 101 through the communication section 504.

In FIG. 7, the management unit 102 (FIG. 5) shown in FIG. 5 first receives the gate passage data of the IC card 104 from the ticket checking machine 101 through the communication section 504 under the control of the control section 501. This gate passage data is stored in the gate passage information storage section 502 (S700). Each gate passage data is retrieved from the gate passage information storage section 502 (S701). Based on the card ID contained in the gate passage data, the corresponding customer data is read from the customer data storage section 503 (S702). In step S703, the outstanding amount information and the validity period information of the commuter pass contained in the gate passage data are compared with the information transmitting conditions contained in the customer data of FIG. 6 stored in the customer data storage section 503, thereby determining whether the information is required to be sent to the portable terminal 100 of the user (S703). In the case where it is determined that the transmission is not required, the process proceeds to step S701, while in the case where it is determined that the transmission is required, on the other hand, the transmitted information contents are produced (S704) and sent to the portable terminal 100 through the network 103 (S705), and the process returns to step S701 to process the next gate passage data.

In the case where the only requirement is to notify that the validity period of the commuter pass is about to expire, a text document is prepared and sent by electronic mail to the portable terminal 100 in step S704. In the case where a predetermined amount is charged automatically, on the other hand, the parameters for starting the charge program held in the portable terminal 100 are also generated and sent directly to the portable terminal 100. The parameters may be prepared on the server and only the connected information may be sent to the portable terminal 100. In step 705, the data prepared are sent to the portable terminal 100.

Figure 8:
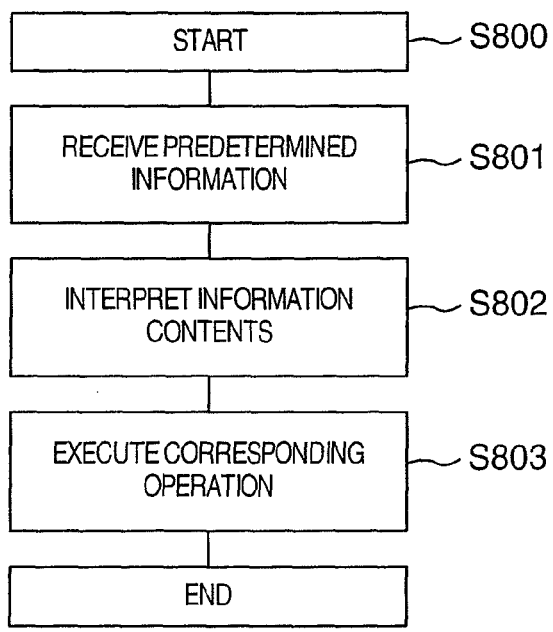
FIG. 8 is a flowchart showing a specific example of the process of operation in which the portable terminal shown in FIG. 1 receives the information transmitted by the management unit through the process shown in FIG. 7.

FIG. 8 is a flowchart showing a specific example of the steps of the operation taken by the portable terminal 100 receiving the transmitted information contents from the management unit 102.

In FIG. 8, the information is first transmitted from the management unit 102 as described above (S800). Then, the portable terminal 100 shown in FIG. 2 receives them through the antenna 107 and the communication section 204 under the control of the control section 201 and holds them in the storage section 203, etc. (S801). The portable terminal 100 then interprets the contents of the received information and determines whether the screen is displayed to indicate that the validity period of the commuter pass is about to expire or the value charge program is started (S802). Based on the result of this determination, the corresponding operation is performed (S803) thereby to terminate the process.

Next, an explanation is given about a case in which the portable terminal 100 comprising additional identification functions such as a fingerprints input section and a camera executes the process of charging the SF value or renewing the validity period of the commuter pass with a further improved security.

Figure 9:
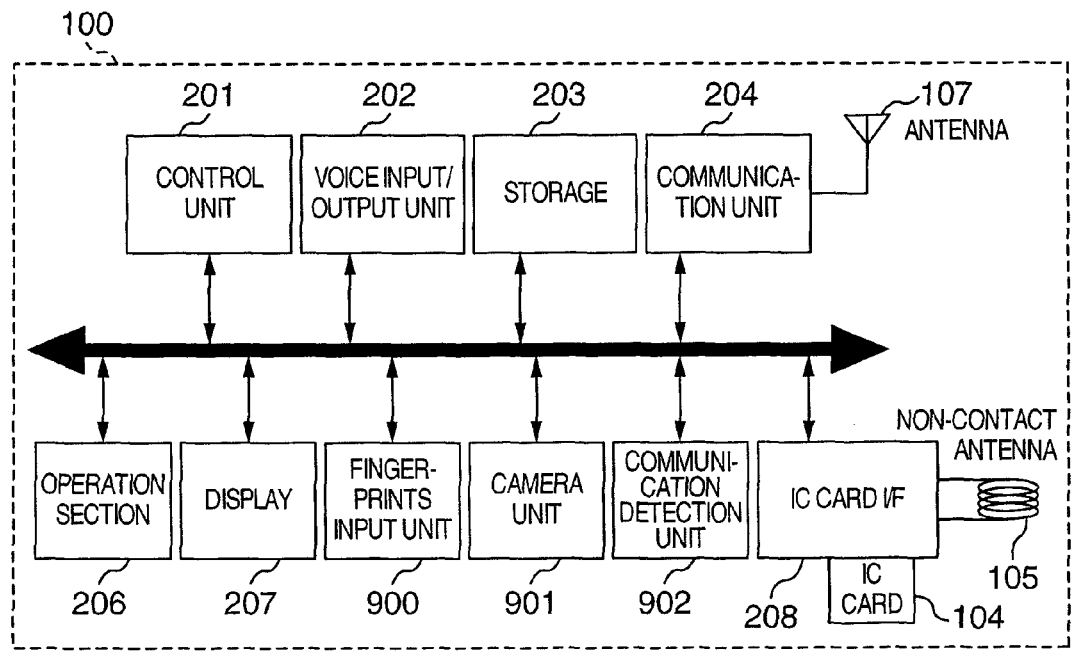
FIG. 9 is a block diagram showing an internal configuration of the portable terminal shown in FIG. 1 according to another embodiment of the invention.

FIG. 9 is a block diagram showing an internal configuration of the portable terminal 100 of FIG. 1 according to another embodiment of the invention. Numeral 900 designates a fingerprints input section, numeral 901 a camera section, and numeral 902 a communication detection section. In FIG. 9, the component parts similar or identical to those in FIG. 2 are designated by the same reference numerals, respectively, as in FIG. 2 and not described again.

According to this embodiment, as shown in FIG. 9, the portable terminal 100, with the added identification functions such as the fingerprints input section 900 and the camera section 901, can charge the SF value or renew the validity period of the commuter pass with a higher security. The fingerprints input section 900 is for inputting the fingerprints for identification, and the camera section 901 for inputting the iris pattern or the facial characteristics for identification. The identification by voice recognition using the voice input/output section 202 is also possible, and so is the identification by the ID or password using the operation section 206 such as the ten-keys.

According to this embodiment, a communication detection section 902 is also added as another function to detect the non-contact IC card communication. Thus, the portable terminal 100 is not required to check the contents of the IC card 104 at regular time intervals but can check them at an appropriate timing.

The identification function can be turned on/off by the user through the operation section 206. Alternatively, the identification function may be set to work when the SF value has been charged five times or when 10000 yen or more is charged. Also, the identification function may be set to work always at the time of renewing the validity period of the commuter pass.

Figure 10:
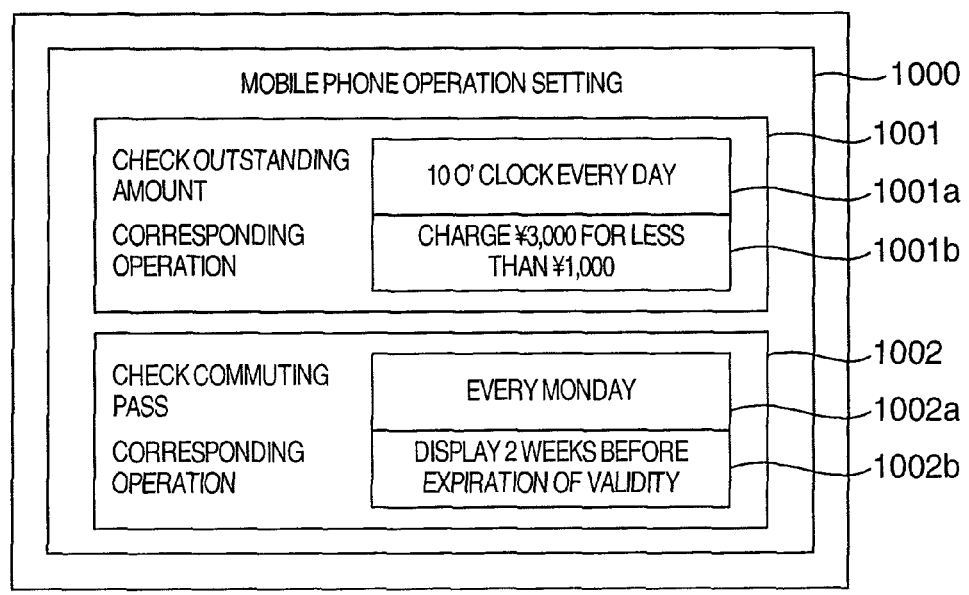
FIG. 10 is a diagram showing a specific example of the screen for setting the conditions for the corresponding operation at a portable terminal according to the invention.

FIG. 10 is a diagram showing a specific example of the corresponding operation setting screen 1000 of the portable terminal 100.

In FIG. 10, the corresponding operation setting screen 1000 includes a value charge setting area 1001 and a commuter pass setting area 1002. The setting area 1001 includes an outstanding SF value check timing setting field 1001*a* and a corresponding operation setting field 1001*b* for setting a corresponding operation. In the case under consideration, the value check timing in the timing setting field 1001*a* is set at "10 o'clock every day", and the corresponding operation in the corresponding operation setting field 1001*b* is set to "charge 3,000 yen for less than 1,000 yen". As the result of these setting, the value in the IC card 104 is checked at 10 o'clock every day, and 3,000 yen is charged each time the outstanding value is reduced to less than 1,000 yen. These setting, however, can be appropriately changed by operating the operation section 206.

In similar fashion, the commuter pass setting area 1002 includes a commuter pass validity period check timing setting field 1002*a* and a corresponding operation setting field 1002*b* for setting a corresponding operation. In the case under consideration, the timing of checking the commuter pass in the timing setting field 1002*a* is set at "every Monday", and the corresponding operation in the corresponding operation setting field 1002*b* is set to "indicate two weeks before validity period expiry". As the result of these setting, the validity period of the commuter pass in the IC card 104 is checked every Monday, and two weeks before expiry of the validity period, the fact is notified to the user on the display section 207 or by the voice input/output section 202 of the portable terminal 100. These setting, however, can also be appropriately changed by operating the operation section 206.

Figure 11:
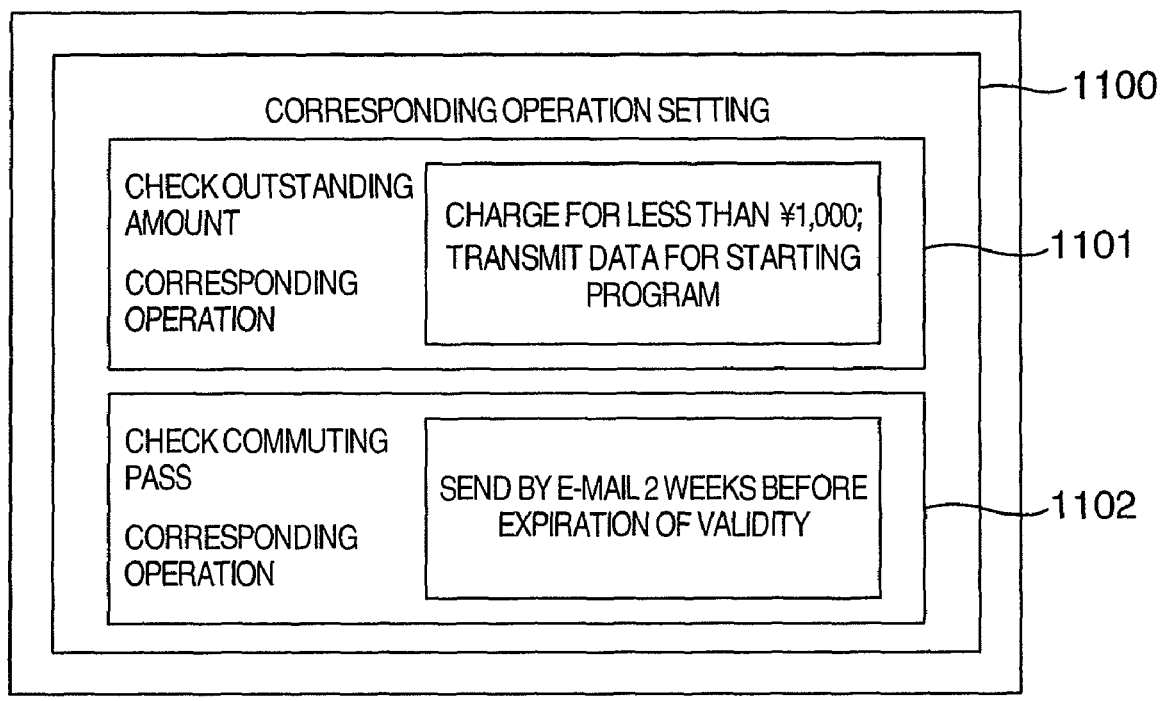
FIG. 11 is a diagram showing another specific example of a screen for setting the conditions for the corresponding operation of a portable terminal according to this invention.

FIG. 11 is a diagram showing a specific example of the corresponding operation conditions setting screen 1100 for setting the conditions for the corresponding operation based on the customer data stored in the customer data storage section 503 of the management unit 102 shown in FIG. 5. The corresponding operation conditions setting screen 1100 is displayed on the display section 207 of the portable terminal 100 shown in FIGS. 2 and 9. The conditions for the corresponding operation set on this screen are transmitted to the management unit 102 through the network 103 from the communication section 204 and the antenna 205, incorporated in the customer data shown in FIG. 6 and stored in the customer data storage section 503.

This corresponding operation conditions setting screen 1100 includes a value charge setting area 1101 and a commuter pass setting area 1002. The setting area 1101 includes a corresponding operation conditions setting area 1101 for setting the conditions for the corresponding operation against the outstanding SF value and a corresponding operation conditions setting area 1102 for setting the conditions for the corresponding operation against the commuter pass. In the corresponding operation conditions setting area 1101 for the outstanding SF value, the conditions for the corresponding operation are set to "charge for less than 1,000 yen", and the contents transmitted for executing the corresponding operation are set to "transmit program starting data". As described above, when the portable terminal 104 carrying the IC card having stored therein these conditions for the corresponding operation is passed through the ticket checking machine 101, the management unit 102 accesses the conditions for the corresponding operation in the customer data stored in the customer data storage section 503 based on the outstanding SF value information and the card ID read by the ticket checking machine. In the case where the outstanding value is less than 1,000 yen, the data for starting the value charge program is sent to the portable terminal 100. These conditions for the corresponding operation can be set and changed by the portable terminal 100 on the corresponding operation conditions setting screen 1100.

This is also the case with the conditions for the corresponding operation about the commuter pass. In the case under consideration, the commuter pass corresponding operation conditions setting area 1102 is set to "transmit by E-mail two weeks before validity period expiry" as the conditions for the corresponding operation. As described above, when the portable terminal 100 having the IC card with these corresponding operation conditions stored therein is passed through the ticket checking machine 101, the management unit 102 accesses the corresponding operation conditions based on the customer data stored in the customer data storage section 503 with reference to the card ID or the commuter pass information such as the validity period read by the ticket checking machine, and in the case where the validity period of the commuter pass is about to expire in two weeks or less, a text document containing the information indicating the fact is prepared and sent to the portable terminal 100. These conditions for the corresponding operation can be set or changed appropriately by the portable terminal 100 on the corresponding operation conditions setting screen 1101.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications as falling within the ambit of the appended claims.

What is claimed is:

1. A portable terminal having an IC card and receiving information from a management apparatus, wherein said management apparatus comprises:
    a portable terminal identifying module to receive card information from a non-contact IC card processing unit having a module to communicate with said IC card without contact and to acquire the card information including IC card identification information and outstanding value information, thereby to identify the portable terminal based on said IC card identification information;
    a memory module to store conditions for a corresponding operation;
    a module to communicate with said portable terminal;
    an information transmission determining module to determine whether predetermined information for charging against an outstanding stored fare value is to be transmitted to said portable terminal identified by said portable terminal identifying module in the case where contents of said card information satisfy said conditions for the corresponding operation; and
    a module to transmit said information determined by said information transmission determining module, and
    wherein said information transmission determining module is capable of performing selected one of an operation of using, as conditions for determining the transmission of predetermined information, selected one of a change item and a change amount of the change item of the card information set by a user of at least said portable terminal, and the operation of permitting the user to set the contents of the information transmitted to said user,
    said portable terminal further comprising:
    an information receiving module to receive predetermined information transmitted by said management apparatus; and
    a corresponding operation module to perform a predetermined corresponding operation in accordance with said predetermined information received by said information receiving module.

2. The portable terminal according to claim 1, wherein said portable terminal receives a text document which is prepared and sent by said management apparatus via electronic mail.

3. The portable terminal according to claim 1, wherein said portable terminal receives, directly from said management apparatus, parameters for starting a predetermined program stored in the portable terminal, said parameters being generated by said management apparatus.

* * * * *